No. 760,969. PATENTED MAY 24, 1904.
J. DERX.
CAR FENDER.
APPLICATION FILED APR. 4, 1904.
NO MODEL.
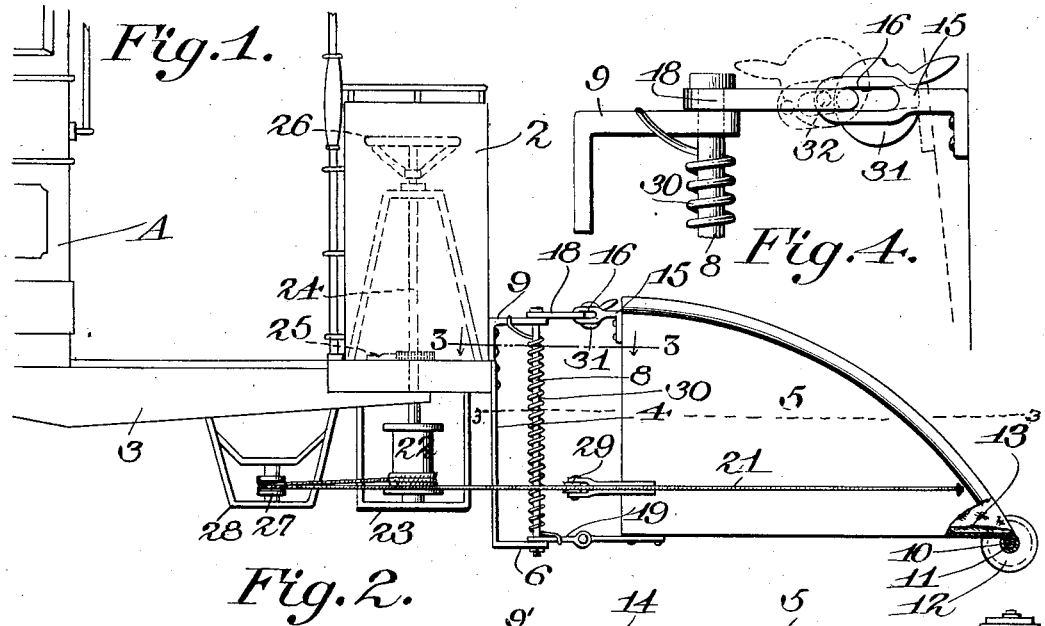
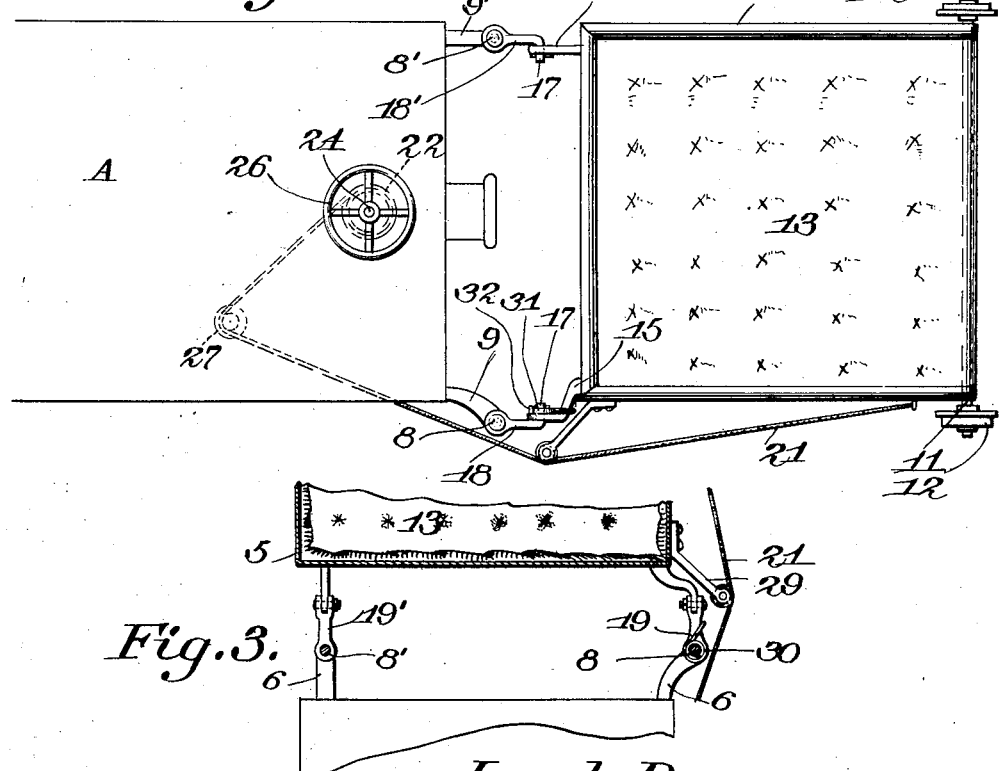
Witnesses
Jacob Derx, Inventor
by C. A. Snow & Co.
Attorneys No. 760,969.

Patented May 24, 1904.

UNITED STATES PATENT OFFICE.

JACOB DERX, OF ST. LOUIS, MISSOURI.

CAR-FENDER.

SPECIFICATION forming part of Letters Patent No. 760,969, dated May 24, 1904.

Application filed April 4, 1904. Serial No. 201,525. (No model.)

*To all whom it may concern:*

Be it known that I, JACOB DERX, a citizen of the United States, residing at St. Louis, in the State of Missouri, have invented a new and useful Car-Fender, of which the following is a specification.

This invention relates to an improved life-guard or fender for street-cars and other vehicles, and has for its object the production of an inexpensive, durable, and efficient device of this character capable of being readily attached to the front or rear end of the car and which will invariably pick up any object it may encounter and effectually prevent injury to persons struck by the car.

A further object of the invention is to provide a fender which will automatically adapt itself to irregularities in the surface of the track and which may be swung laterally to permit coupling of the cars and to allow the latter to be compactly stored in the car house or barn.

A still further object is to provide means for locking the front end of the fender in the elevated position, so as to permit said fender to clear any obstruction on the road-bed when adjusting the same laterally to couple the cars and to provide means for automatically returning the fender to its normal position after the cars have been uncoupled.

The invention consists in the construction and novel combination and arrangement of parts hereinafter fully described, illustrated in the accompanying drawings, and pointed out in the claims hereto appended, it being understood that various changes in form, proportion, and minor details of construction may be resorted to without departing from the principle or sacrificing any of the advantages of this invention.

In the accompanying drawings, forming a part of this specification, Figure 1 is a side elevation of a portion of a car, showing a fender constructed in accordance with my invention attached thereto. Fig. 2 is a top plan view of the same. Fig. 3 is a longitudinal sectional view taken on the line 3 3 of Fig. 1, and Fig. 4 is a detail side elevation of the link and cam for locking the front end of the fender in the elevated position.

Similar characters of reference indicate corresponding parts in all the figures of the drawings.

The car A, which may be of the ordinary form and construction, is provided with the usual dashboard 2 and platform 3, to the front end of the latter of which is secured in any suitable manner a pair of brackets 4, designed to support the fender 5, as shown. The brackets 4 are provided with angularly-disposed arms 6, having terminal openings formed therein adapted to receive connecting-rods 8 and 8', said rods passing through coincident openings formed in corresponding or mating brackets 9, secured in any suitable manner to the dashboard 2. The fender 5 is preferably formed of sheet metal and has its forward end bent downwardly, as indicated at 10, to form a bearing for the axle 11 of the wheels or rollers 12, which latter bear against the ribs and support the front end of the fender. The bottom, side, and end walls of the fender are preferably upholstered or otherwise padded, as shown at 13, so as to form a cushion for the fender, and thereby prevent injury to the person or persons coming in contact therewith. Riveted or otherwise secured to the rear wall of the fender at a point adjacent the top thereof are brackets 14 and 15, each provided with a terminal slot 16, adapted to receive the laterally-disposed hooked ends 17 of connecting-links 18 and 18', respectively, the opposite ends of said links being pivotally supported on the connecting-rods, so as to permit the fender to be swung laterally against the side of the car when coupling and uncoupling, as will be more fully explained hereinafter. Pivotally mounted on the rods 8 and 8' and bearing against the angularly-disposed arms 6 of the brackets 4 are connecting-links 19 and 19', the ends of which are bifurcated, as shown, for the reception of the ends of supporting-arms 20, secured in any suitable manner to the bottom of the fender.

The links 19 and 19' form a pivotal connection between the car and the bottom of the fender, thereby permitting the fender to be tilted upwardly when the latter strikes any obstruction on the road-bed.

As a means for swinging the fender laterally against the side of the car I provide a cable or other flexible medium 21, one end of which is attached to the side of the fender and the opposite end thereof secured to a drum 22, journaled in a bracket 23, secured to the bottom of the car. The drum 22 is keyed on a vertical shaft 24, provided with a pawl and ratchet 25 and a hand-operated wheel 26, by means of which the shaft may be revolved to wind the cord on the drum. The cord 21 passes over a loose pulley 27, journaled in a bracket 28, secured to the bottom of the platform 2, and is held out of contact with the rod 8 by an idle pulley 29, secured to the rear end of the fender, as shown. Mounted on the connecting-rod 8 is a preferably coiled spring 30, one end of which is secured to the bracket 9 and the opposite end thereof to the link 19, so that as the shaft 24 is revolved to wind the cord on the drum 22, and thereby swing the fender laterally, the spring will contract, and when the ratchet mechanism is released said spring will automatically return the fender to its normal position. As a means for raising the forward end of the fender and locking the same in the elevated position while the fender is being swung laterally I provide a cam 31, loosely mounted on the hooked end 17 of one of the connecting-links, said cam being adapted to engage a pin 32, fastened to the bracket 15, and raise the forward end of the fender when said cam is turned, as will be readily understood.

In operation when for any reason the car becomes disabled and it is desired to return the same to the barn the rod 8' is removed and the cam 31 thrown forward to elevate the front end of the fender. The wheel 26 is then rotated to wind the cord on the drum, which causes the fender to swing laterally on the rod 8 to a position approximately parallel to the side of the car, thereby permitting the adjacent car to be readily coupled. When the ratchet 25 is released, the coil-spring 30 will automatically return the fender to the front of the car, in which position it may be locked by inserting the rod 8' through the supporting-bracket and connecting-links, as will be readily understood.

Having thus described the invention, what is claimed is—

1. The combination with a car, of a fender mounted for swinging movement to inoperative position at the side of said car.

2. The combination with a car, of a fender mounted for swinging movement to inoperative position at the side of the car, and means for automatically returning the fender to operative position.

3. The combination with a car, of a fender, mounted for swinging movement to inoperative position at the side of the car, and means for locking the forward end of the fender in an elevated position preliminary to adjusting said fender laterally.

4. The combination with a car, of a fender mounted for swinging movement to inoperative position at the side of the car, means for locking the forward end of the fender in an elevated position preliminary to adjusting said fender laterally, and means for returning the fender to operative position.

5. The combination with a car, of a fender pivotally secured thereto, means for swinging the fender laterally to inoperative position, and means for returning said fender to operative position.

6. The combination with a car, of supporting-brackets thereto, a fender pivoted to the brackets and mounted for swinging movement to inoperative position, at the side of the car, and means for automatically returning the fender to its operative position.

7. The combination with a car, of a fender mounted for swinging movement to inoperative position at the side of the car, a drum mounted on the car, a flexible connection between the drum and fender, means for turning the drum to adjust the fender laterally, and means for returning said fender to normal position.

8. The combination with a car, of supporting-brackets secured thereto, a fender, a pivotal connection between the bottom of the fender and the supporting-brackets, a slotted connection between the upper portion of the fender and said brackets, a removable rod connecting one end of the fender to the corresponding supporting-bracket, means for swinging the fender laterally to inoperative position when said rod is removed, and means for automatically returning the fender to operative position.

9. The combination with a car, of supporting-brackets secured thereto, a fender mounted for swinging movement on said brackets to inoperative position at the side of the car, said fender having its forward end bent downwardly to form a bearing, and a shaft provided with terminal wheels or rollers journaled in said bearing.

10. The combination with a car, of supporting-brackets secured thereto, rods carried by the brackets, links pivotally mounted on the rods, a fender pivoted to said links, a spring carried by one of the rods, and a flexible cable, one end of which is attached to the fender and the opposite end thereof to the car.

11. The combination with a car, of supporting-brackets secured thereto, a fender having its lower portion pivoted to said brackets, links connecting the upper portion of the fender with the brackets, and a cam carried by one of the links for locking the forward end of the fender in elevated position.

12. The combination with a car, of a fender mounted for swinging movement to inoperative position at the side of the car, and means for automatically returning the fender to the operative position, said fender having its interior walls padded to form cushions.

In testimony that I claim the foregoing as my own I have hereto affixed my signature in the presence of two witnesses.

JACOB DERX.

Witnesses:
   J. H. JOCHUM, Jr.,
   S. N. ACKER.